(12) United States Patent
Swaminathan et al.

(10) Patent No.: US 11,898,443 B2
(45) Date of Patent: Feb. 13, 2024

(54) METHOD FOR PERFORATION CLUSTERS STIMULATION EFFICIENCY DETERMINATION

(71) Applicant: Halliburton Energy Services, Inc., Houston, TX (US)

(72) Inventors: Tirumani N. Swaminathan, Houston, TX (US); Dinesh Ananda Shetty, Sugarland, TX (US); Vladimir Nikolayevich Martysevich, Spring, TX (US); Jianfu Ma, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 264 days.

(21) Appl. No.: 17/199,114

(22) PCT Filed: Dec. 6, 2018

(86) PCT No.: PCT/US2018/064257
§ 371 (c)(1),
(2) Date: Mar. 11, 2021

(87) PCT Pub. No.: WO2020/117244
PCT Pub. Date: Jun. 11, 2020

(65) Prior Publication Data
US 2021/0396083 A1    Dec. 23, 2021

(51) Int. Cl.
*E21B 47/00* (2012.01)
*E21B 43/26* (2006.01)
(Continued)

(52) U.S. Cl.
CPC ............ *E21B 49/008* (2013.01); *E21B 43/26* (2013.01); *E21B 47/06* (2013.01); *G06F 17/17* (2013.01)

(58) Field of Classification Search
CPC ........ E21B 49/008; E21B 43/26; E21B 47/06; G06F 17/17
See application file for complete search history.

(56) References Cited

U.S. PATENT DOCUMENTS

| | | | |
|---|---|---|---|
| 2003/0050758 A1* | 3/2003 | Soliman | E21B 43/26 702/6 |
| 2011/0120702 A1* | 5/2011 | Craig | E21B 43/26 703/2 |

(Continued)

FOREIGN PATENT DOCUMENTS

| | | |
|---|---|---|
| WO | 2017196357 | 11/2017 |
| WO | 2018132106 | 7/2018 |

OTHER PUBLICATIONS

ISRWO International Search Report and Written Opinion for PCT/US2018/064257 dated Sep. 6, 2019.
(Continued)

*Primary Examiner* — Brad Harcourt
(74) *Attorney, Agent, or Firm* — Michael Jenney; C. Tumey Law Group PLLC

(57) ABSTRACT

A method may comprise identifying one or more pressure dissipation mechanisms that drop pressure within a fluid handling system, identifying one or more open flowpath elements, performing a matching algorithm with an information handling system, and initializing the matching algorithm with an estimate of a coefficient. A system may comprise a fluid handling system and an information handling system. The fluid handling system may comprise a fluid supply vessel, wherein the fluid supply vessel is disposed on a surface, pumping equipment, wherein the pumping equipment is attached to the fluid supply vessel and disposed on the surface; a wellbore supply conduit, wherein the wellbore supply conduit is attached to the pumping equipment and disposed in a formation, and a flowpath (Continued)

element, wherein the flowpath element fluidly couples the wellbore supply conduit to the formation.

20 Claims, 3 Drawing Sheets

(51) Int. Cl.
*E21B 49/00* (2006.01)
*E21B 47/06* (2012.01)
*G06F 17/17* (2006.01)

(56) References Cited

U.S. PATENT DOCUMENTS

| | | |
|---|---|---|
| 2015/0066445 A1 | 3/2015 | Lin et al. |
| 2015/0315894 A1 | 11/2015 | Guo |
| 2016/0259088 A1 | 9/2016 | Carvajal et al. |
| 2016/0273346 A1* | 9/2016 | Tang .................. E21B 43/04 |
| 2016/0333684 A1* | 11/2016 | James .................. E21B 49/008 |
| 2017/0145793 A1* | 5/2017 | Ouenes .................. E21B 43/26 |
| 2018/0172872 A1* | 6/2018 | Fouda .................. G01V 3/28 |
| 2018/0216442 A1 | 8/2018 | Shetty et al. |
| 2019/0128111 A1* | 5/2019 | Pandey .................. H03M 7/30 |

OTHER PUBLICATIONS

The Pennsylvania State University, Gun-Ho Kim, Interpretation of Hydraulic Fracturing Pressure in Low-Permeability Gas Reservoirs, 2010.
Nocedal—Nocedal, J, and S J Wright, 2006, Numerical Optimization. Springer New York.
Lalee, Lalee, Marucha, Jorge Nocedal, and Todd Plantega, 1998, On the implementation of an Algorithm for large-scale equality constrained optimization. SIAM journal on Optimization 8.3:L 682-706.
PE—Prodigi Intelligent Fracturing Service, Datasheet, H012925, Jun. 2019.
Halliburton—AccessFrac Stimulation Service, H08720, Jun. 2013.

* cited by examiner

METHOD FOR PERFORATION CLUSTERS STIMULATION EFFICIENCY DETERMINATION

BACKGROUND

Fracturing treatments are commonly used in subterranean operations, among other purposes, to stimulate the production of desired fluids (e.g., oil, gas, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more fractures in the subterranean formation. The creation and/or enhancement of these fractures may enhance the production of fluids from the subterranean formation.

Understanding stimulation fluid path in horizontal and vertical wells during hydraulic fracturing operation in unconventional reservoirs is always a challenge for the oil and gas industry. For example, during hydraulic fracturing operation an operator may have to determine perforation parameters. Parameters may include stage length, spacing between clusters, how many clusters, how many holes to shoot per cluster, etc. The ability for an operator to have insights for dynamics of flowpath discrete elements behavior during hydraulic fracturing operations as well as diagnostics pumping procedures may be beneficial.

BRIEF DESCRIPTION OF THE DRAWINGS

These drawings illustrate certain aspects of some of the present disclosure, and should not be used to limit or define the disclosure.

DETAILED DESCRIPTION

The systems, methods, and/or compositions disclosed herein may relate to subterranean operations and, in some systems and methods for determining how perforations of a wellbore may operate in an underground formation. Perforation parameters may be described as adding (opening) perforation hole/cluster and/or difference in number of holes/clusters between any of the two moments during the hydraulic fracturing treatments. These parameters may be utilized to enhance hydraulic fracturing operation.

Figure 1:
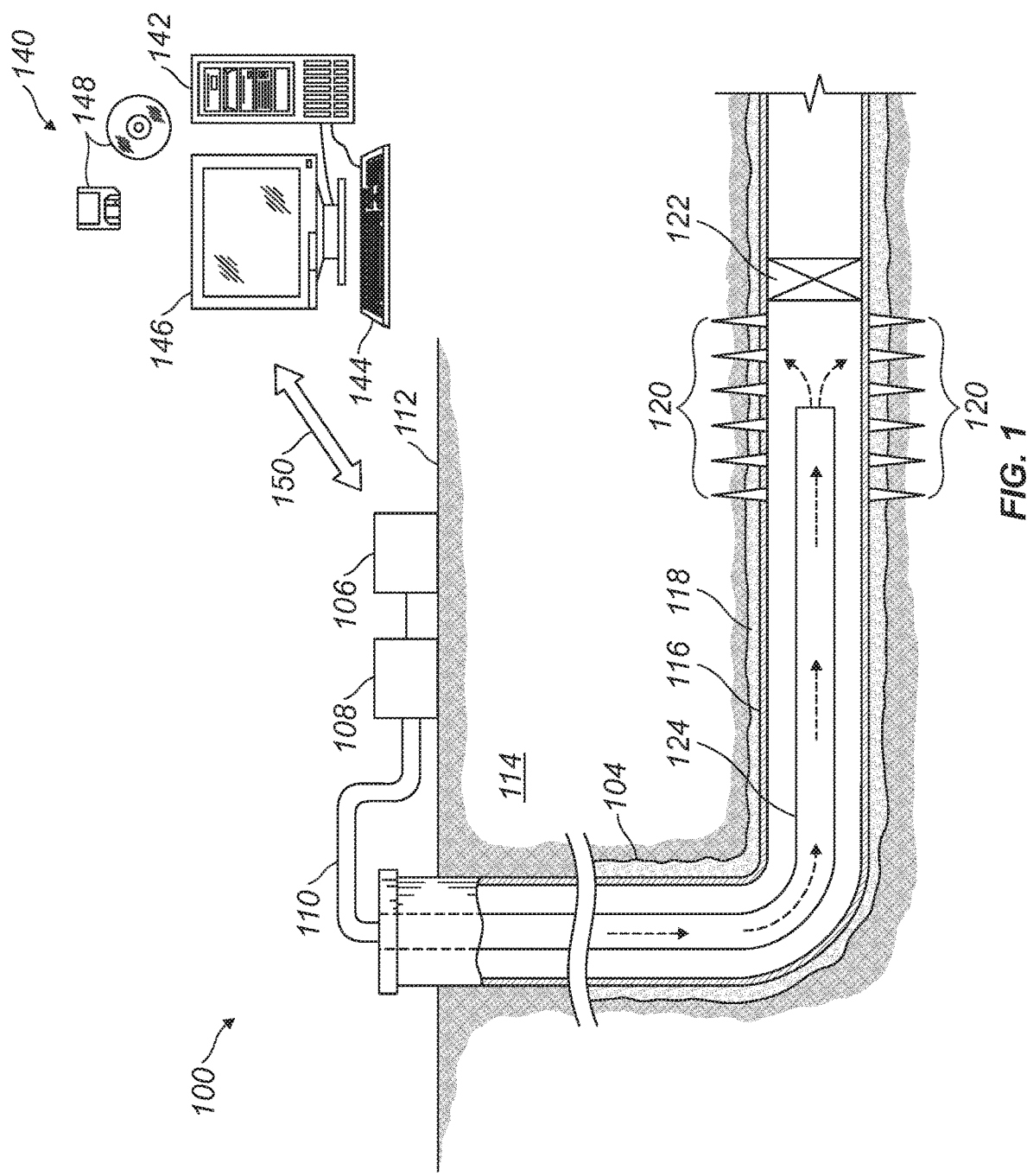
FIG. 1 is a schematic illustration of example well system showing placement of a treatment fluid into a wellbore.

FIG. 1 illustrates an example well system 100 that may be used for preparation and delivery of a treatment fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure.

Referring now to FIG. 1, a fluid handling system 102 is illustrated. Fluid handling system 102 may be used for preparation of a treatment fluid comprising the pelletized diverting agent and for introduction of the treatment fluid into a wellbore 104. The fluid handling system 102 may include mobile vehicles, immobile installations, skids, hoses, tubes, fluid tanks or reservoirs, pumps, valves, and/or other suitable structures and equipment. As illustrated, the fluid handling system 102 may comprise a fluid supply vessel 106, pumping equipment 108, and wellbore supply conduit 110. While not illustrated, the fluid supply vessel 106 may contain one or more components of the treatment fluid (e.g., pelletized diverting agent particulates, base fluid, etc.) in separate tanks or other containers that may be mixed at any desired time. Pumping equipment 108 may be fluidically coupled with the fluid supply vessel 106 and wellbore supply conduit 110 to communicate the treatment fluid into wellbore 104. Fluid handling system 102 may also include surface and downhole sensors (not shown) to measure pressure, rate, temperature and/or other parameters of treatment. Fluid handling system 102 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 1, the fluid supply vessel 106 and pumping equipment 108 may be above the surface 112 while the wellbore 104 is below the surface 112. As will be appreciated by those of ordinary skill in the art, well system 100 may be configured as shown in FIG. 1 or in a different manner, and may include additional or different features as appropriate. By way of example, fluid handling system 102 may be deployed via skid equipment, marine vessel, or may be comprised of sub-sea deployed equipment.

Systems and methods of the present disclosure may be implemented, at least in part, with an information handling system 140. Information handling system 140 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 140 may be a personal computer 142, a network storage device, or any other suitable device and may vary in size, shape, performance, functionality, and price. Information handling system 140 may include random access memory (RAM), one or more processing resources such as a central processing unit (CPU) or hardware or software control logic, ROM, and/or other types of nonvolatile memory. Additional components of information handling system 140 may include one or more disk drives, one or more network ports for communication with external devices as well as various input and output (I/O) devices, such as a keyboard 144, a mouse, and a video display 146. Information handling system 140 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 148 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, information handling system 128 may communicate with the plurality of sensors (not illustrated) through a communication line 150, which may monitor fluid handling system 102. In examples, wireless communication may be used to transmit information back and forth between information handling system 140 and the plurality of sensors. Information handling system 140 may transmit information to the plurality of sensors and may receive as well as process information recorded by the plurality of sensors. In addition, the plurality of sensors may include a downhole information handling system (not illustrated), which may also be disposed within wellbore 104. Processing may be performed at surface with information handling system 140, downhole with the downhole information handling system, or both at the surface and downhole. The downhole information handling system may include, but is not limited to, a microprocessor or other suitable circuitry, for estimating, receiving and processing signals received by the plurality of sensors. The downhole information handling system may further include additional components, such as memory, input/output devices, interfaces, and the like.

Figure 2:
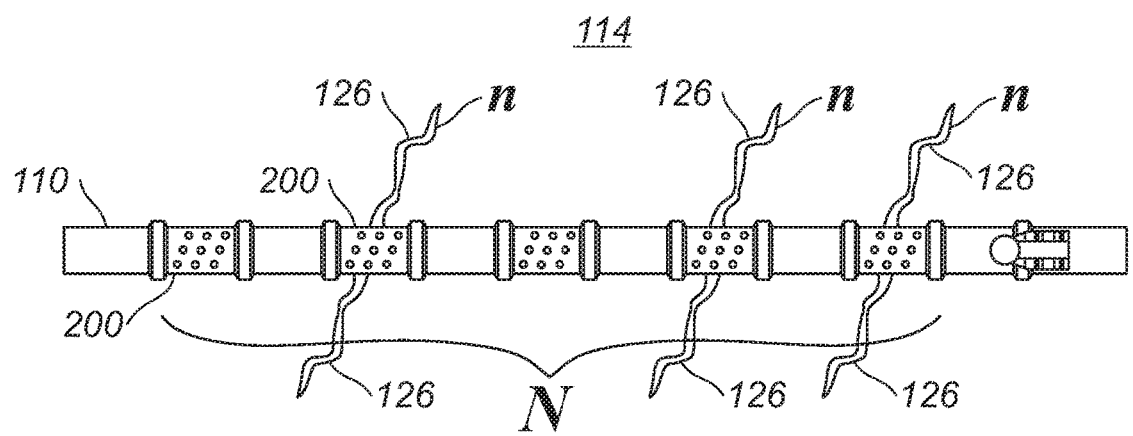
FIG. 2 is a schematic illustration of wellbore components of the flow path from the wellbore into a formation.

FIG. 2 illustrates a wellbore 104 disposed in formation 114. Without limitation, wellbore 104 may include any number of flowpath elements 200. Flowpath elements 200 may fluidly connect wellbore 104 with formation 114, which may form fractures 126. In examples, fractures 126 may be represented in fluid handling system 102 (e.g., referring to FIG. 1) by the number of flowpath elements 200 (which may also be represented as a variable "n") which may be added or excluded from fluid handling system 102 during the pumping operations. Maximum possible number of flowpath elements 200 (which may be represented as the variable "N") may be determined by completion parameters of an identified wellbore. Examples of the discrete elements of fluid handling system 102 may include wellbore, perforation clusters or perforation holes and connected to them hydraulic fractures. During pumping operation, as the pressure in the wellbore increases, some of the hydraulic fractures may be initiated earlier than others, they may grow and connect additional perforations or clusters. While pumping fracturing fluids, proppants and other solid particulates or chemicals the discrete elements may be added (acid treatment) or excluded (screen-out, diverter plugging) from fluid handling system 102. In examples, the conditions of each flowpath element 200 may be changed dynamically (perforation erosion or near wellbore ("NWB") path change may gradually change friction coefficients). It should be noted that the NWB characteristics may determine geometry of the flowpath in volume close to the wellbore. Pressure in fluid handling system 102 may depend on friction parameters of each element 200 as well as numbers of flowpath elements 200.

Figure 3:
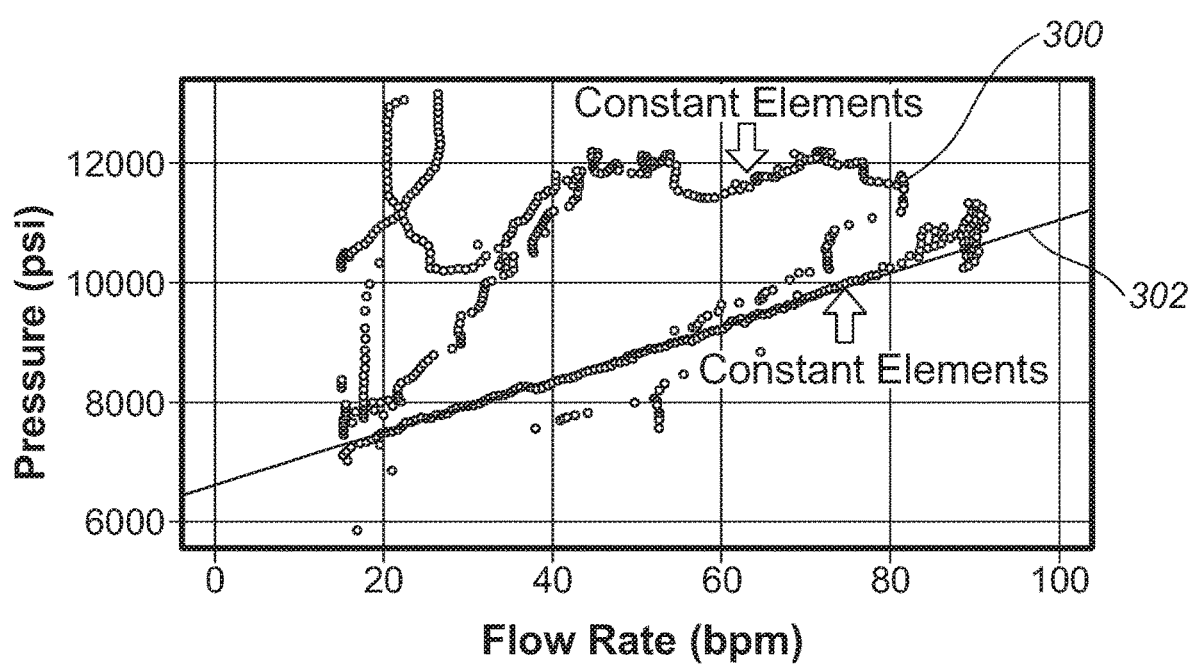
FIG. 3. is a graph of a measured data points from a fracturing operation illustrating pressure response vs flowrate.

As discussed above, wellbore 104 connected to fractures 126 through active flowpath elements 200 may be represented as a dynamic flowpath system with limited number of elements (n) which may be added or excluded from the system during pumping operations and/or fracking operations. During operations, an operator may identify phases of the hydraulic fracturing operation wherein the number of major flowpath elements 200 does not change and, at the same time, there is a variation in the pumping rate of the fluid in that phase. The identification of these phases may be done in a variety of ways including, examining the pumping schedule to identify periods of constant operations, using analytical methods to determine the occurrences of such phases by looking at the probability distributions of all the different modes and classifying the highest occurrence or occurrences as those corresponding to such phases, and/or looking at the variation of pressure with the flow rate as a plot, as illustrated in FIG. 3, and visually identifying regions of constant elements. For examples, data points 300 indicated measurements taken of flowpath elements 200 (e.g., referring to FIG. 2). Measurements from data points 300 on sloped line 302 may indicate a number of flowpath elements 200 that may be constant. It should be noted that data points 300 may not be on sloped line 302 but follow the same linear path, which may also indicate a number of flowpath elements 200 that may be constant.

For each such phase, pressure dissipation among all the major elements in a hydraulic fracturing operation may sum to a total. Thus for all the elements, the individual pressure dissipation terms may be added as a series of "m" flow resistances of the form:

$$P_{section} = \sum_{i=1}^{m} f_i \left( \frac{Q^{\alpha_i}}{n^{\beta_i}} \right)$$

Where $P_{section}$ is the measured or calculated pressure drop across a discrete element or any number of discrete elements, Q is the total flow rate, n is the number of open elements and f is the resistance coefficient. Each term may be identified, either by a physical understanding of a particular pressure dissipation mechanism, or statistically, using a machine algorithm, or by a combination of the two. The corresponding coefficient for an individual mechanism, $f_i$, may be initially estimated and constrained by correlating it with the known factors affecting that particular pressure dissipation mechanism. In examples, as described below, a pressure dissipation mechanism may be identified as laminar flow, friction across a perforation, pressure drop due to vertical elevation, valves, elbows, turbulent flow in a pipe section, fracture tortuosity, in-situ stress of a formation, flow inside a proppant laden zone, and/or the like.

For example, one particular mechanism may be identified as the pressure drop due to laminar flow in a pipe section. In this case $\alpha_i$ may be 1.0, $\beta_i$ may be 0.0 and $f_i$ may be estimated and constrained around $128\mu/D^4_z$ per unit length of the pipe, where μ is the viscosity of the fluid and D is the diameter of the wellbore.

A second mechanism may be identified as the pressure drop due to friction across the perforation. In this case $\alpha_i$ may be 2.0, $\beta_i$ may be 2.0 and $f_i$ may be estimated and constrained around $0.2369\rho/C_D^2 \, d^4$, where ρ is the density of the fluid and d is the diameter of the perforation and $C_D$ may be estimated as a coefficient of discharge dependent on the perforation diameter.

A third particular mechanism may be identified as the pressure drop due to vertical elevation. In this case $\alpha_i$ may be 0.0, $\beta_i$ may be 0.0 and $f_i$ may be estimated and constrained around —ρg per unit vertical length of the pipe, where ρ is the density of the fluid and g is the acceleration due to gravity.

A fourth particular mechanism may be identified as the pressure drop due to valves, elbows or other elements resembling those. In this case $\alpha_i$ may be 1.0, $\beta_i$ may be 0.0 and $f_i$ may be estimated and constrained around ρ, where ρ is the density of the fluid and ζ is the resistance coefficient as determined by a test or specified by a vendor.

A fifth particular mechanism may be identified as the pressure drop due to turbulent flow in a pipe section. In this case $\alpha_i$ may be 2.0, $\beta_i$ may be 0.0 and $f_i$ may be estimated and constrained around the Darcy-Weisbach friction factor (eg. From the Colebrook Equation or from the Zigrang-Sylvester Equation), applicable to the Reynolds number regime of the flow.

A sixth mechanism may be identified as the pressure drop due to fracture tortuosity. In this case $\alpha_i$ may be 0.5, $\beta_i$ may be 0.5 and $f_i$ may be estimated from previously observed values.

A seventh mechanism may be identified as the pressure resistance due to the in-situ stress of the formation. In this case $\alpha_i$ may be 0.0, $\beta_i$ may be 0.0 and $f_i$ may be estimated from the instantaneous shut-in pressure, a rate variation test or some other mechanism.

An eighth mechanism may be identified as the pressure drop due to the flow inside a proppant laden zone. In this case $\alpha_i$ may be 1.0, $\beta_i$ may be 1.0 and $f_i$ may be estimated from the effective proppant pack conductivity as applied to get an equivalent permeability.

Figure 4:
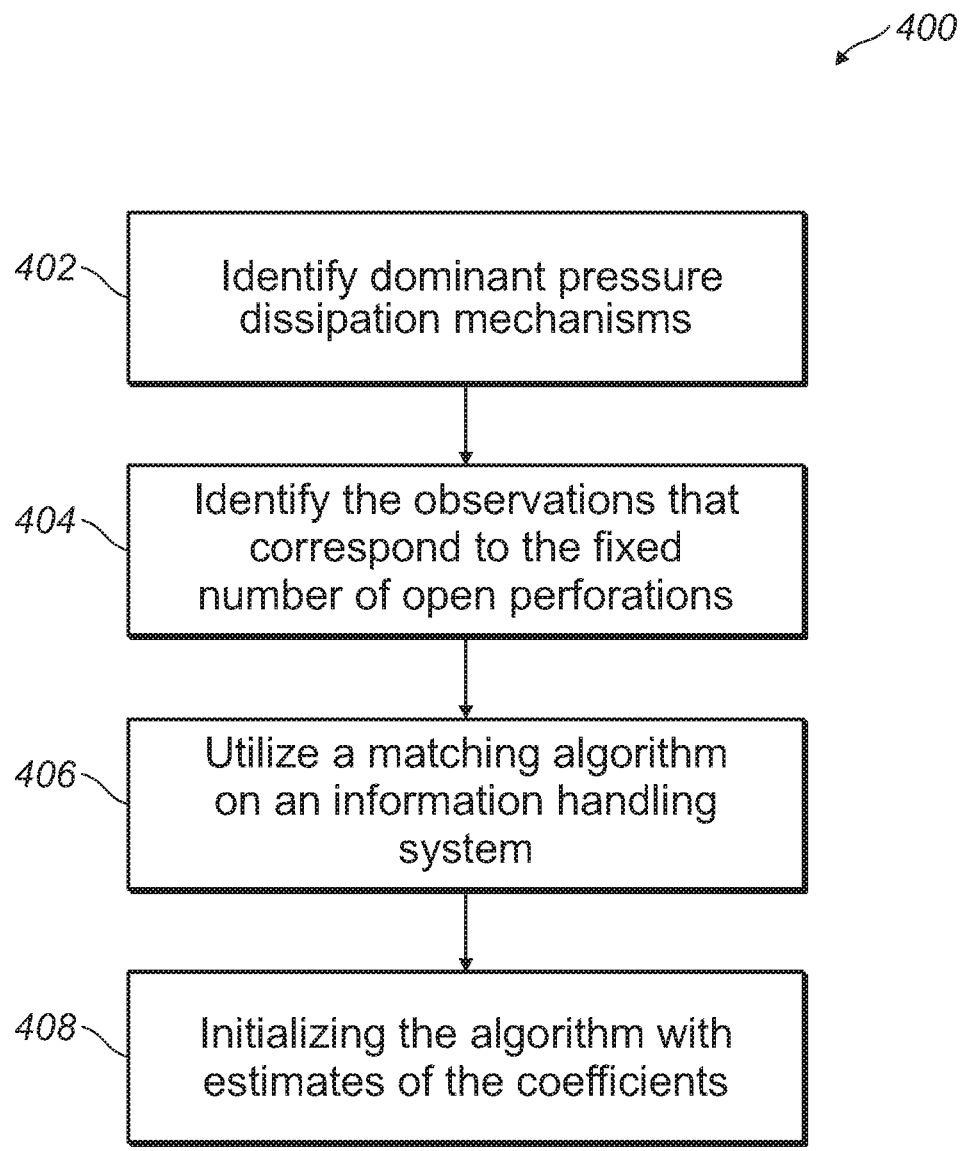
FIG. 4 is a flowchart for an algorithm to determine the values of an individual component.

Without limitation, an algorithm for determining the values of the individual components may be found in workflow 400, as illustrated in FIG. 4. In step 402, an operator may identity at least one dominant pressure dissipation mechanisms present. In some examples, each dominant pressure dissipation mechanism present may be identified. For example, as illustrated in FIG. 3, the wellbore friction, the tortuosity resistance, the perforation resistance and the in-situ stress are the main mechanisms. The initial estimate for the dominant pressure dissipation mechanism may come from models (eg, perforation model, tortuosity model etc.) or from data from tests for example stepdown. In step 404, the operator may identify the observations that correspond to the fixed number of open perforations (as illustrated in FIG. 2). The operator may ensure that the number of distinct observation is at least two larger than, and preferably much larger than, the number of pressure dissipation mechanism coefficients used in step 402. In step 406, the operator may use a matching algorithm, for example the 'trust region reflective algorithm' (ref:Nocedal) or the 'dogleg algorithm with rectangular trust regions' (ref:Lalee) to find the coefficients by such that the predicted pressure from these mechanisms is as close to the observed pressure while simultaneously solving for the number of open perforations. In step 408, the operator may initialize the algorithm with the estimates of the coefficients and constrained by the physics as outlined above. If the error between predicted and observed pressure is not acceptable, the process may be repeated by visiting step 402 where more pressure dependent mechanisms may be inserted. Once determined, these coefficients and number of open elements may be used in either additional analysis of the fracture or used to change the following pumping schedule to either, address any shortcomings in the development of the fracture, or to increase production from the fracture.

Improvements over current technology may provide in situ pressure diagnostics, identify current perforation conditions during fracturing operations, and/or allow for an operator to make stimulation decisions during fracking operations.

This systems and methods may include any of the various features of the compositions, methods, and system disclosed herein, including one or more of the following statements.

Statement 1. A method may comprise identifying one or more pressure dissipation mechanisms that drop pressure within a fluid handling system; identifying one or more open flowpath elements; performing a matching algorithm with an information handling system; and initializing the matching algorithm with an estimate of a coefficient.

Statement 2. The method of statement 1, wherein the one or more pressure dissipation mechanisms are a wellbore friction, a tortuosity resistance, a perforation resistance, or an in-situ stress.

Statement 3. The method of statements 1 or 2, wherein the matching algorithm is a trust region reflective algorithm or a dogleg algorithm with a rectangular trust region.

Statement 4. The method of statements 1-3, further comprising changing a pumping schedule.

Statement 5. The method of statements 1-4, further comprising examining a pumping schedule to identify at least one period of constant operation.

Statement 6. The method of statements 1-5, further comprising identifying one or more phases in which one or more flowpath elements are constant.

Statement 7. The method of statement 6, wherein the identifying the one or more phases is performed by examining a pumping schedule, creating a probability distribution, or creating a graph of a pressure in view of a flow rate.

Statement 8. The method of statement 7, wherein the graph of the pressure in view of the flow rate records one or more constant flow elements.

Statement 9. The method of statements 1-5, further comprising dividing the one or more pressure dissipation mechanisms among one or more flowpath elements.

Statement 10. The method of statement 9, wherein the dividing the one or more pressure dissipation mechanisms among one or more discrete elements is found with $$P_{section} = \sum_{i=1}^{m} f_i\left(\frac{Q^{\alpha_i}}{n^{\beta_i}}\right),$$

wherein $P_{section}$ is a measured or a calculated pressure drop, Q is a total flow rate, n is a number of open flowpath elements, and f is a resistance coefficient.

Statement 11. A system may comprise a fluid handling system. The fluid handling system may comprise a fluid supply vessel, wherein the fluid supply vessel is disposed on a surface; pumping equipment, wherein the pumping equipment is attached to the fluid supply vessel and disposed on the surface; a wellbore supply conduit, wherein the wellbore supply conduit is attached to the pumping equipment and disposed in a formation; and a flowpath element, wherein the flowpath element fluidly couples the wellbore supply conduit to the formation. The system may further comprise an information handling system configured to identify one or more pressure dissipation mechanisms that drop pressure in the fluid handling system; identify one or more open flow elements; perform a matching algorithm with the information handling system; and initialize the matching algorithm with an estimate of a coefficient.

Statement 12. The system of statement 11, wherein the one or more pressure dissipation mechanisms are a wellbore friction, a tortuosity resistance, a perforation resistance, or an in-situ stress.

Statement 13. The system of statements 11 or 12, wherein the matching algorithm is a trust region reflective algorithm or a dogleg algorithm with a rectangular trust region.

Statement 14. The system of statements 11-13, wherein the information handling system is further configured to change a pumping schedule.

Statement 15. The system of statements 11-14, wherein the information handling system is further configured to examine a pumping schedule to identify at least one period of constant operation.

Statement 16. The system of statements 11-15, wherein the information handling system is further configured to identify one or more phases in which one or more flowpath elements are constant.

Statement 17. The system of statement 16, wherein the information handling system is further configured to examine a pumping schedule, create a probability distribution, or create a graph of a pressure in view of a flow rate.

Statement 18. The system of statement 17, wherein the graph of the pressure in view of the flow rate records one or more constant flow elements.

Statement 19. The system of statements 11-15, wherein the information handling system is further configured to divide the one or more pressure dissipation mechanisms among one or more flowpath elements.

Statement 20. The system of statement 19, wherein the information handling system is further configured to use $$P_{section} = \sum_{i=1}^{m} f_i\left(\frac{Q^{\alpha_i}}{n^{\beta_i}}\right),$$

wherein $P_{section}$ is a measured or a calculated pressure drop, Q is a total flow rate, n is a number of open flowpath elements, and f is a resistance coefficient.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method, comprising:
   conducting a pumping operation comprising pumping a treatment fluid into a subterranean formation;
   creating at least one fracture in the subterranean formation;
   obtaining pressure measurements from a pressure sensor during the pumping operation;
   identifying one or more pressure dissipation mechanisms within a fluid handling system from at least the pressure measurements, wherein the one or more pressure dissipation mechanisms comprise a perforation resistance and a tortuosity resistance;
   identifying one or more active flowpath elements from the pressure dissipation mechanisms;
   performing a matching algorithm with an information handling system using the pressure dissipation mechanisms; and
   initializing the matching algorithm with an estimate of a coefficient.

2. The method of claim 1, wherein the one or more pressure dissipation mechanisms further comprise a wellbore friction or an in-situ stress.

3. The method of claim 1, wherein the matching algorithm is a trust region reflective algorithm or a dogleg algorithm with a rectangular trust region.

4. The method of claim 1, further comprising changing a pumping schedule.

5. The method of claim 1, further comprising examining a pumping schedule to identify at least one period of constant operation.

6. The method of claim 1, further comprising identifying one or more phases in which one or more flowpath elements are constant.

7. The method of claim 6, wherein the identifying the one or more phases is performed by examining a pumping schedule, creating a probability distribution, or creating a graph of a pressure in view of a flow rate.

8. The method of claim 7, wherein the graph of the pressure in view of the flow rate records one or more constant flow elements.

9. The method of claim 1, further comprising dividing the one or more pressure dissipation mechanisms among one or more flowpath elements.

10. The method of claim 9, wherein the dividing the one or more pressure dissipation mechanisms among one or more discrete elements is found with $$P_{section} = \sum_{i=1}^{m} f_i\left(\frac{Q^{\alpha_i}}{n^{\beta_i}}\right),$$

wherein $P_{section}$ is a measured or a calculated pressure drop, Q is a total flow rate, n is a number of open flowpath elements, and f is a resistance coefficient.

11. A system comprising:
a fluid handling system comprising:
a fluid supply vessel, wherein the fluid supply vessel is disposed on a surface;
pumping equipment, wherein the pumping equipment is attached to the fluid supply vessel and disposed on the surface;
a wellbore supply conduit, wherein the wellbore supply conduit is attached to the pumping equipment and disposed in a formation; and
a flowpath element, wherein the flowpath element fluidly couples the wellbore supply conduit to the formation;
a pressure sensor, wherein the pressure sensor obtains pressure measurements during a pumping operation; and
an information handling system configured to:
identify one or more pressure dissipation mechanisms in the fluid handling system from at least the pressure measurements, wherein the one or more pressure dissipation mechanisms comprise a perforation resistance and a tortuosity resistance;
identify one or more active flow elements from the pressure dissipation mechanisms;
perform a matching algorithm with the information handling system using the pressure dissipation mechanisms; and
initialize the matching algorithm with an estimate of a coefficient.

12. The system of claim 11, wherein the one or more pressure dissipation mechanisms further comprise a wellbore friction or an in-situ stress.

13. The system of claim 11, wherein the matching algorithm is a trust region reflective algorithm or a dogleg algorithm with a rectangular trust region.

14. The system of claim 11, wherein the information handling system is further configured to change a pumping schedule.

15. The system of claim 11, wherein the information handling system is further configured to examine a pumping schedule to identify at least one period of constant operation.

16. The system of claim 11, wherein the information handling system is further configured to identify one or more phases in which one or more flowpath elements are constant.

17. The system of claim 16, wherein the information handling system is further configured to examine a pumping schedule, create a probability distribution, or create a graph of a pressure in view of a flow rate.

18. The system of claim 17, wherein the graph of the pressure in view of the flow rate records one or more constant flow elements.

19. The system of claim 11, wherein the information handling system is further configured to divide the one or more pressure dissipation mechanisms among one or more flowpath elements.

20. The system of claim 19, wherein the information handling system is further configured to use $$P_{section} = \sum_{i=1}^{m} f_i\left(\frac{Q^{\alpha_i}}{n^{\beta_i}}\right),$$

wherein $P_{section}$ is a measured or a calculated pressure drop, Q is a total flow rate, n is a number of open flowpath elements, and f is a resistance coefficient.

* * * * *